United States Patent [19]

Sotoya et al.

[11] Patent Number: 4,846,947
[45] Date of Patent: Jul. 11, 1989

[54] PROCESS FOR PREPARING AN ALKANOLAMMONIUM SALT OR AMMONIUM SALT OF SURFACE ACTIVE AGENTS

[75] Inventors: Kohshiro Sotoya; Makoto Kubo; Kazuhiko Okabe; Masanobu Tanigaki; Masaji Yamanishi, all of Wakayama, Japan

[73] Assignee: Kao Corporation, Tokyo, Japan

[21] Appl. No.: 122,455

[22] Filed: Nov. 19, 1987

[30] Foreign Application Priority Data

Dec. 3, 1986 [JP] Japan .................. 61-287898

[51] Int. Cl.$^4$ .................................. B01D 13/02
[52] U.S. Cl. ...................... 204/182.4; 204/131; 204/301
[58] Field of Search .............. 204/301, 182.3, 180.1, 204/182.4, 182.5, 182.6, 131

[56] References Cited

FOREIGN PATENT DOCUMENTS 61-067783 4/1986 Japan .
62-063555 3/1987 Japan .

Primary Examiner—John F. Niebling
Assistant Examiner—John S. Starsiak, Jr.
Attorney, Agent, or Firm—Oblon, Spivak, McClelland, Maier & Neustadt

[57] ABSTRACT

A novel process for preparing an alkanolammonium salt or ammonium salt of an amino acid surface active agent or an acylated amino acid surface active agent. In the process, an alkali metal salt of an amino acid surface active agent or acylated amino acid surface active agent is subjected to electrodialysis in the presence of a mineral acid salt of an alkanolamine or ammonia, or a mixture of an alkanolamine or ammonia and a mineral acid. By-products which are produced during the preparation of the above surface active agents can be mostly removed to outside during the electrodialysis and are thus purified conveniently.

3 Claims, 1 Drawing Sheet

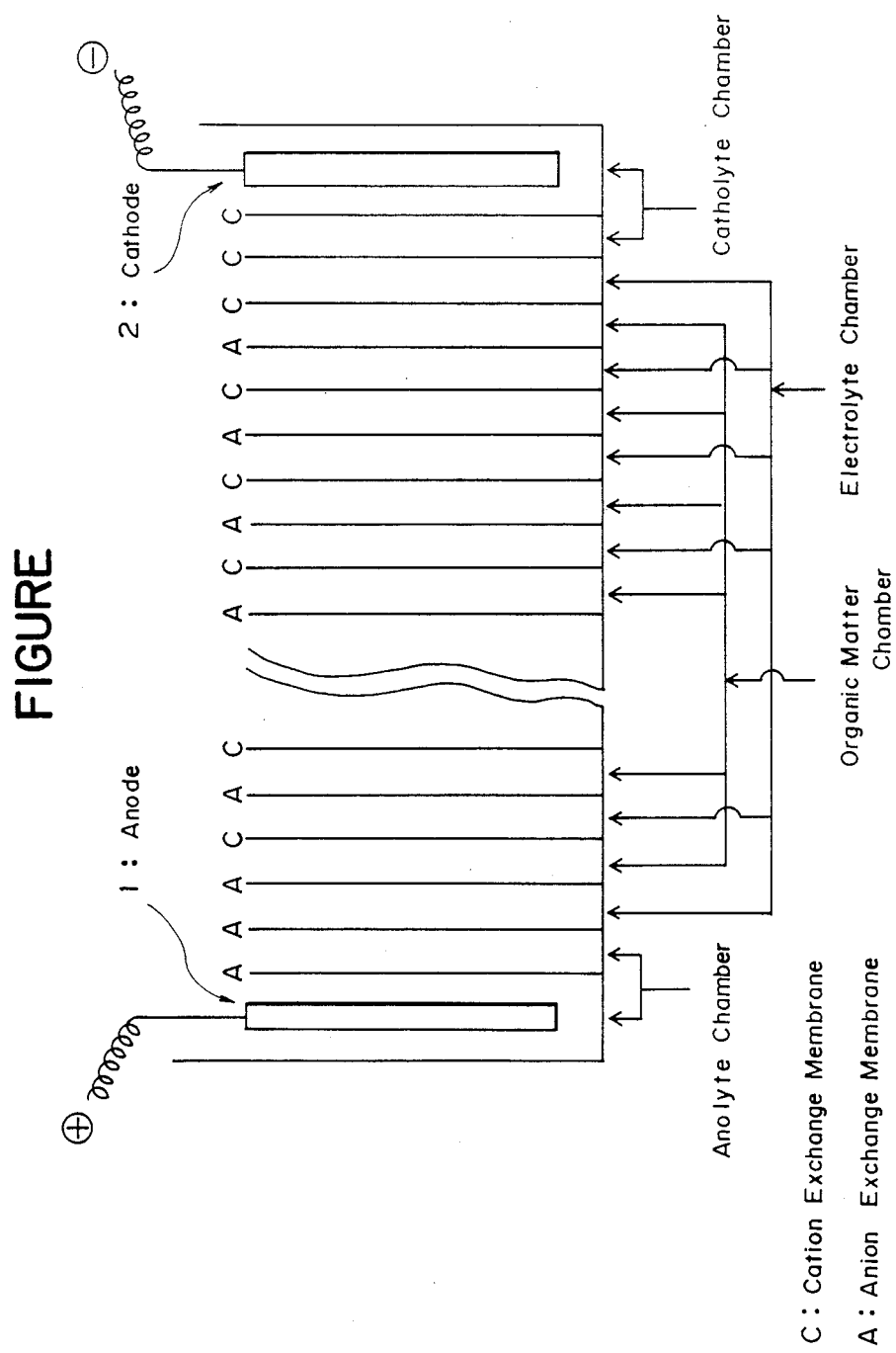

PROCESS FOR PREPARING AN ALKANOLAMMONIUM SALT OR AMMONIUM SALT OF SURFACE ACTIVE AGENTS

BACKGROUND OF THE INVENTION

1. Field of the Invention

This invention relates to a process for preparing an alkanolammonium salt or ammonium salt of surface active agents and more particularly, to a novel process for preparing an alkanolammonium salt or ammonium salt of an amino acid surface active agent or an acrylated amino acid surface active agent.

2. Description of the Prior Art

In view of a recent trend toward the safety and low stimulativeness, imidazoline amphoteric surface active agents and amino acid surface active agents have been widely used in shampoo bases and various detergents because of their low stimulativeness. Especially, imidazoline amphoteric surface active agents are ease in the manner of preparation and are inexpensive, so that they have been widely used and extensively studied.

In general, imidazoline amphoteric surface active agents are prepared by reacting alkylimidazolines with sodium monochloroacetate. The imidazoline amphoteric surface active agents obtained by the above process have been found by recent studies to be amidoamine derivatives which are products obtained by ring opening of imidazolines, but little imidazoline skelton which has been long considered as contained has not been present in the agents. For instance, the agents have the following structure (I)

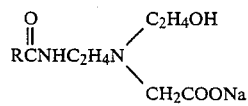

in which R represents an alkyl group.

Accordingly, this type of imidazoline amphoteric surface active agent may be prepared by reaction between an amidoazmine and sodium monochloroacetate.

When the alkali metal salt of the surface active agent is converted to an alkanolammonium salt or an ammonium salt, it exhibits good miscibility with water-soluble polymers and various additives because of the low ion strength. In addition, because of the low Krafft point, such an agent has good stability at low temperatures. For known processes of preparing alkanolammonium salts or ammonium salts of the imidazoline amphoteric surface active agents, the alkali metal salts of the imidazoline amphoteric surface active agents (e.g. sodium salts) are treated with a mineral acid to give an acid form, followed by neutralization with an alkanolamine or ammonia.

However, the above process is disadvantageous in that when the acid form is produced by treatment with a mineral acid, sodium chloride is formed in large amounts to cause gelation or mineral acid salt of the amine is produced, making it difficult to efficiently produce an alkanolammonium salt or an ammonium salt. For instance, when an imidazoline amphoteric surface active agent of the formula (I) was treated with hydrochloric acid as a mineral acid and subsequently neutralized with triethanolamine, an intended product of (I)-a with high purity could be obtained but only a mixture of (I)-a - (I)-c and (I) was obtained as shown in the following reaction formula

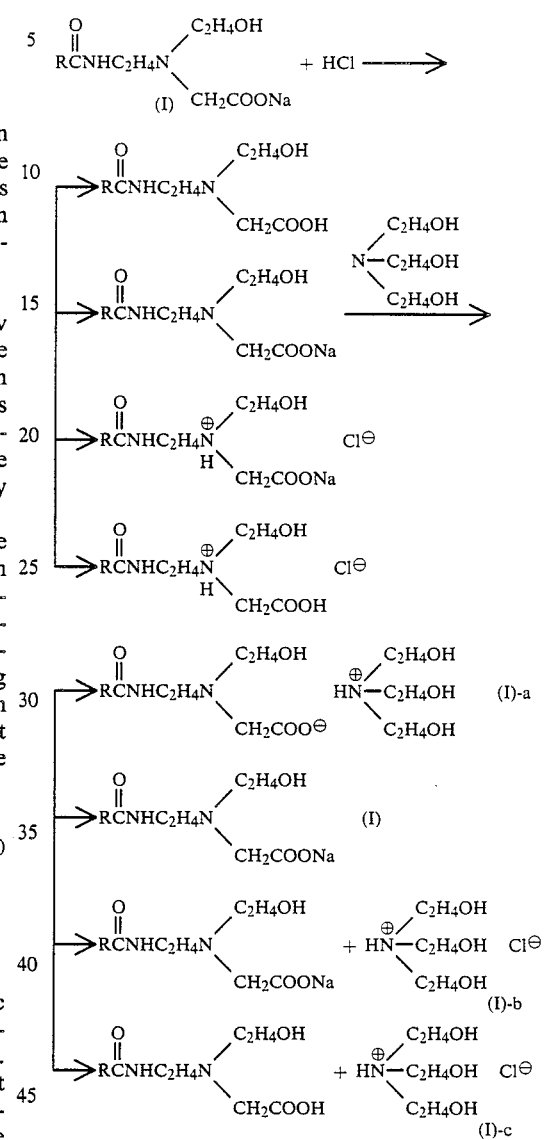

in which R has the same meaning as defined before.

These phenomena take place commonly in all the cases including amino acid surface active agents and acylated amino acid surface active agents. As a result, the resultant product inevitably contain large amounts of impurities such as salts (e.g. NaCl). Thus, these alkanolammonium salts or ammonium salts of these surface active agents cannot exhibit inherent characteristic properties such as good miscibility with various additives and low temperature stability.

SUMMARY OF THE INVENTION

Under these circumstances in the art, the present inventors made intensive studies so as to solve the above problem and found that an alkanolammonium salt or an ammonium salt of an amino acid surface active agent or an acylated amino acid surface active agent can be simply and efficiently produced by electrodialysis. The present invention has been accomplished based on the above finding.

The present invention provides a process for preparing an alkanolammonium salt or an ammonium salt of an amino acid surface active agent or an acylated amino acid surface active agent which is characterized by subjecting an alkali metal salt of an amino acid surface active agent or an acylated amino acid surface active agent to electrodialysis in the presence of a mineral acid salt of an alkanolamine or ammonia, or a mixture of an alkanolamine or ammonia and a mineral acid.

BRIEF DESCRIPTION OF THE DRAWING

The sole FIGURE is a schematic view showing an example of an electrodialysis apparatus used in the present invention.

DETAILED DESCRIPTION OF THE INVENTION AND PREFERRED EMBODIMENTS

In the practice of the invention, the alkali metal salts of amino acid surface active agents are those alkali metal salts of aminocarboxylic acids or aminosulfonic acids having at least one primary, secondary or tertiary amino group and at least one carboxyl group or sulfonic acid group in the molecule. Examples of such alkali metal salts are alkali metal salts of compounds of the following formulae (a)-(f).

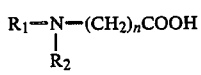  (a)

in which $R_1$ represents a hydrogen atom, and alkyl group, alkenyl group, aralkyl group or hydroxyalkyl group each having 1 to 22 carbon atoms, or a group of the formula,

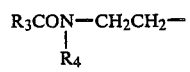

in which $R_3$ represents an alkyl group, alkenyl group or aralkyl group having 1 to 22 carbon atoms, or a hydroxyalkyl group, and $R_4$ represents a hydrogen atom, a methyl group, an ethyl group or a hydroxyethyl group, and $R_2$ represents a hydrogen atom, $-(CH_2CH_2O)_m-H$,

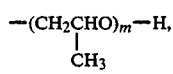

$-(CH_2)_nCOOH$, in which m is an integer of from 1 to 10, and n is an integer of from 1 to 5, or an alkyl, alkenyl, aralkyl group or hydroxyalkyl group having 1 to 22 carbon atoms.

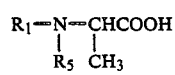  (b)

in which $R_5$ has the same meaning as $R_2$ or

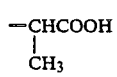

and $R_1$ has the same meaning as defined above.

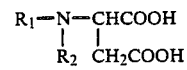  (c)

in which $R_1$ and $R_2$ have the same meanings as defined above, respectively.

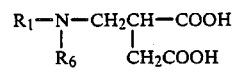  (d)

in which $R_6$ is a hydrogen atom, $-(CH_2CH_2O)_mH$,

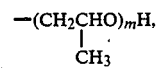

in which m has the same meaning as defined above,

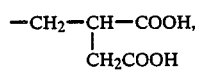

or an alkyl, alkenyl, hydroxylalkyl or aralkyl group having 1 to 22 carbon atoms.

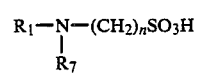  (e)

in which $R_7$ represents a hydrogen atom, $-(CH_2CH_2O)_mH$,

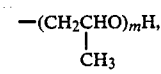

$-(CH_2)_nSO_3H$, in which m and n have, respectively, the same meanings as defined before, or an alkyl group, alkenyl group, hydroxyalkyl group or aralkyl group having 1 to 22 carbon atoms.

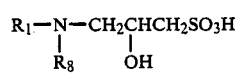  (f)

in which $R_8$ represents a hydrogen atom, $-(CH_2CH_2O)_mH$,

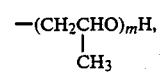

in which m has the same meaning as defined before,

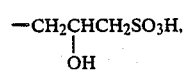

or an alkyl group, alkenyl group, hydroxyalkyl group or aralkyl group having 1 to 22 carbon atoms.

The above compound (a) may contain one or more of imidazoline amphoteric surface active agents or compounds of the following three structures

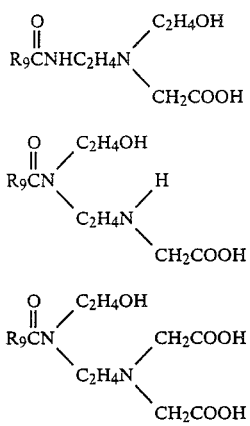

in which $R_9$ represents an alkyl group, alkenyl group, hydroxyalkyl group or aralkyl group having 7 to 21 carbon atoms.

The alkali metal salts of acylated amino acid surface active agents are, for example, those alkali metal salts of the following formulae (g)-(i).

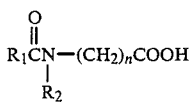 (g)

in which $R_1$, $R_2$ and n have, respectively, the same meanings as defined before.

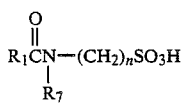 (h)

in which $R_1$, $R_7$ and n have, respectively, the same meanings as defined before.

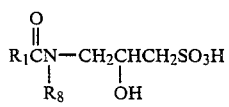 (i)

in which $R_1$ and $R_8$ have, respectively, the same meanings as defined before.

An example of an electrodialysis vessel used for carrying out the process of the invention is schematically shown in the sole FIGURE. The process of the invention is illustrated with reference to the accompanying drawing.

Anion exchange membranes (A) and cation exchange membranes (C) are alternately arranged, and an alkali metal salt of an amino acid surface active agent or acylated amino acid surface active agent and a mineral acid salt of an alkanolamine or ammonia or a mixture of a mineral acid and an alkanolamine or ammonia are placed in each partitioned chamber (organic matter chamber) between two types of membranes. An electrolytic solution is placed in adjacent chambers (electrolyte chambers), through which a direct current is passed, so that the alkali metal ions are moved from the organic matter chambers towards the electrolyte chambers thereby causing an alkanolamine salt or ammonium salt of the amino acid surface active agent or acylated amino acid surface active agent in the respective organic matter chambers to be formed.

The mineral acids used in the practice of the invention are not critical and include hydrochloric acid, sulfuric acid and phosphoric acid, of which hydrochloric acid is preferred. The mineral acid salts of an alkanolamine or ammonia are preferably salts of an alkanolamine or ammonia and the above-indicated mineral acids.

The order of addition of the substances to be added to the organic matter chamber is not critically limited. When a mineral acid and an alkanolamine or ammonia are used, the alkanolamine or ammonia may be first added to the starting surface active agent, to which a mineral acid is added, and vice versa. Alternatively, one of the substances may be continuously added while continuing the electrodialysis.

The amount of the alkanolamine or ammonia is preferably at least an equimolar amount of the alkali metal salt of the surface active agent. Smaller amounts result in unsatisfactory counter ion exchange, whereas excessive amounts undesirably permit impurities to be left in the reaction system after the electrodialysis or require a long time for the electrodialysis. Accordingly, it is preferred to use 1.0 to 3.0 times by mole. The amount of the mineral acid is generally in the range of 0.8 to 1.5 times by mole, preferably from 1.0 to 1.5 times by mole the amount of ammonia or an alkanolamine. If a mineral acid salt of an alkanolamine or ammonia is used, its amount may be the same as the amount of the alkanolamine or ammonia defined above.

The electrolytes used are not critical and may by any substances which are able to dissociate in water or at a gradient potential. In general, inorganic compounds such as sodium chloride, sodium sulfate, potassium chloride, potassium sulfate, ammonium chloride, ammonium sulfate and the like are appropriately used. An aqueous solution of the electrolyte is used in the chambers contacting the respective electrode plates. These solutions are preferably circulated such as by pumps. The current value used is favorably not larger than a critical current density. This critical current density will greatly vary depending upon the type, concentration and temperature of solution, and the type of dialysis vessel. Accordingly, the current density is not critically determined, but is generally in the range of from 0.1 to 10 amperes/dm$^2$.

The alkanolammonium salt or ammonium salt of the amino acid surface active agent produced in the organic matter chambers are obtained by collection of the liquid in the chambers and may be used as it is or after concentration, if necessary.

The present invention enables one to prepare alkanolammonium salts or ammonium salts of amino acid surface active agents or acylated amino acid surface active agents, which have not been produced in high purity, in a simple and efficient manner with a high purity. According to the invention, by-products which are produced during the preparation of these surface active agents, e.g. impurities such as inorganic salts, unreacted halogenated carboxylic acids or unreacted halogenated sulfonic acids and hydrolyzates thereof, can be mostly removed to the outside during the electrodialysis.

EXAMPLE 1

268 g (1 mol) of 1-hydroxyethyl-2-lauryl imidazoline, 90 g of water and 2 g of sodium hydroxide were placed in a four-necked flask equipped with an agitator, a condenser, a dropping funnel and a thermometer and heated to 80° C. while agitating, followed by continuing the agitation at the temperature for about 2 hours to cause the imidazoline to be ring opened. Subsequently, a separately prepared solution of 233 g (2 mol) of sodium monochloroacetate and 427.0 g of water were charged into the flask. While the temperature of the solution was maintained at 70 to 80° C., 200 g of an aqueous 40% sodium hydroxide solution was dropped in 4 hours. After completion of the dropping, the reaction system was aged at a temperature of 75 to 80° C. to obtain an aqueous solution of about 30% of N-lauroyl-N'-2-hydroxyethyl-N'-sodium carboxymethylethylethylenediamine. Thereafter, 149.2 g (1 mol) of triethanolamine was added to the solution and cooled. The resultant solution was a light brown liquid with a pH of about 9. The thus obtained solution was subjected to electrodialysis. The electrodialysis was effected, as shown in the sole FIGURE, by circulating the mixed solution of N-lauroyl-N'-2-hydroxyethyl-N'-sodium carboxymethylethylenediamine and triethanolamine to each partitioned chamber (organic matter chambers) alternately arranged between the anion exchange membrane and the cation exchange membrane, a 1% NaCl aqueous solution to adjacent chambers, and a 3% Glauber's salt solution as an anolyte or catholyte, and applying a direction current. During the electrodialysis, 213.8 g (2.05 mol) of 35% HCl was uniformly added in about 4 hours to the mixed solution.

The electrodialysis apparatus used in this example had an arrangement having 10 anion exchange membranes and 10 cation exchange membranes, each having a size of 0.02 m$^2$. The current used was an initial current density of 2 amperes/dm$^2$ and applied over 12 hours. A final current density after 12 hours was 0.1 ampere/dm$^2$.

In this manner, an about 35% solution of N-lauroyl-N'-2-hydroxyethyl-N'-triethanolaminocarboxymethylethylene-diamine was obtained. The analyses of Na in the product and the triethanolamine by liquid chromatography revealed that counter ions were exchanged at 98%. The analysis of Cl also revealed that the content of NaCl in the product was only 0.6 parts by weight per 100 parts by weight of the product.

Part of the product was dried under reduced pressure and subjected to IR analysis, and was identified as a substance of the following formula.

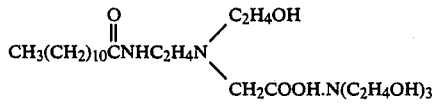

EXAMPLE 2

268 g (1 mol) of 1-hydroxyethyl-2-lauryl imidazoline, 90 g of water and 2 g of sodium hydroxide were placed in a four-necked flask equipped with an agitator, a condenser, a dropping funnel and a thermometer and heated to 80° C. while agitating, followed by continuing the agitation at the temperature for about 2 hours to cause the imidazoline to be ring opened. Subsequently, a separately prepared solution of 233 g (2 mol) of sodium monochloroacetate and 427 g of water were charged into the flask. While the temperature of the solution was maintained at 70 to 80° C., 200 g of an aqueous 40% sodium hydroxide solution was dropped in 4 hours, the reaction system was aged at a temperature of 75 to 80° C. to obtain an aqueous solution of about 30% of N-lauroyl-N'-2-hydroxyethyl-N'-sodium carboxymethylethylene-diamine. The thus obtained solution was subjected to electrodialysis. The electrodialysis was effected, as shown in the sole FIGURE, by circulating the mixed solution of N-lauroyl-N'-2-hydroxyethyl-N'-sodium carboxymethylethylenediamine and triethanolamine to each partitioned chamber (organic matter chambers) alternately arranged between the anion exchange membrane (A) and the cation exchange membrane (C), a 1% NaCl aqueous solution to adjacent chambers, and a 3% Glauber's salt solution as an anolyte or catholyte, and applying a directed current. During the electrodialysis, 535 g (2.0 mol) of 20% NH$_4$Cl was uniformly added to the mixed solution in about 4 hours.

The electrodialysis apparatus used in this example had an arrangement having 10 anion exchange membranes and 10 cation exchange membranes, each having a size of 0.02 m$^2$. The current used was an initial current density of 2 amperes/dm$^2$ and applied over 12 hours. A final current density after 12 hours was 0.1 ampere/dm$^2$.

In this manner, an about 20% solution of N-lauroyl-N'-2-hydroxyethyl-N'-ammoniocarboxymethylethylenediamine was obtained. The analyses of Na and N in the product revealed that counter ions were exchanged at 95%. Part of the product was dried under reduced pressure and subjected to IR analysis, thus being identified as a substance of the following formula.

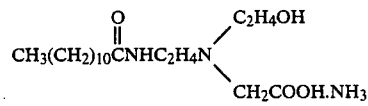

EXAMPLE 3

N-Lauryl-beta-alanine ethyl ester obtained by the addition reaction between laurylamine and ethyl acrylate was purified by distillation. 285 g (1 mol) of the thus obtained N-lauryl-beta-alanine ethyl ester was dispersed in 630 g of water, into which 100 g (1 mol) of a 40% NaOH aqueous solution was dropped in about 1 hour while agitating at 70 to 75° C. After completion of the dropping, the reaction mixture was aged at the same temperature as used above for about 2 hours. It was confirmed by gas chromatography that the saponification was completed. Thus, a mixed solution of a sodium salt of 27.5% of N-lauryl-beta-alanine and ethanol was obtained. Thereafter, 149.2 g (1 mol) of triethanolamine and 104.3 g (1 mol) of 35% HCl were added to the solution in this order while agitating. The resultant solution had a pH of 9.0 and a viscosity of 80 cps/25° C. This solution was subjected to electrodialysis for 4 hours using the same electrodialysis as in Example 1. The electrolytic solution and the solution for the electrodes were those same as used in Example 1.

The current applied was an initial current of 0.8 amperes/dm$^2$ and a final current of 0.1 ampere/dm$^2$ after 4 hours. The resultant solution was a colorless, transparent and viscous liquid, which was a solution of 32% of the triethanolamine salt of N-lauryl-beta-alanine having a pH of about 9 and viscosity of 160 cps/25° C. The analyses of Na and triethanolamine revealed that the exchange of counter ions was almost 100%. The content of NaCl was only 0.6%. The IR analysis of the product revealed that is was a substance of the following formula.

$$C_{12}H_{25}NHCH_2CH_2COOH \cdot N(C_2H_4OH)_3$$

EXAMPLE 4

343 g (1 mol) of sodium N-lauroyl-N-methyltaurine (Nikkol LMT, by Nikko Chemicals Co., Ltd.) and 1150 g of water were charged into a four-necked flask equipped with an agitator, a condenser, a dropping funnel and a thermometer, for dissolution at about 40° C. Subsequently, 149.2 g (1 mol) of triethanolamine and 104.3 g (1 mol) of 35% HCl were added to the solution in this order while agitating sufficiently. The resultant solution was a colorless transparent liquid having a pH of 6.4 and a viscosity of 15 cps/25° C.

This solution was subjected to electrodialysis for 8 hours by the use of a similar electrodialysis as used in Example 1. The current applied was an initial current of 0.4 amperes/dm² and a final current of 0.1 ampere/dm² after 8 hours. The resultant solution was a colorless, transparent liquid which was a solution of about 27% of the triethanolamine salt of N-lauroyl-N-methyltaurine having a pH of about 6 and a viscosity of 10 cps/25° C. The analyses of Na and Cl revealed that the exchange of the counter ions was at 97%. The content of NaCl was only 0.3%.

$$\underset{\underset{CH_3}{|}}{CH_3(CH_2)_{10}\overset{O}{\overset{\|}{C}}NCH_2CH_2SO_3H \cdot N(C_2H_4OH)_3}$$

What is claimed is:

1. A process for preparing an alkanolammonium salt or ammonium salt of
   (a) an amino acid surface active agent selected from aminocarboxylic acids or aminosulfonic acids having at least one primary, secondary or tertiary amino group and at least one carboxyl group or sulfonic acid group in the molecule or
   (b) an acylated amino acid surface active agent, which comprises:
   providing an electrodialysis cell partitioned into a plurality of chambers by cation exchange membranes and anion exchange membranes alternately arranged in said electrodialysis cell;
   placing an alkali metal salt of said amino acid surface active agent or said acylated amino acid surface active agent and
   a mineral acid salt of an alkanolamine or ammonia, or
   a mixture of a mineral acid and an alkanolamine or ammonia
   in said chambers adjacent to an electrolyte containing chamber; and
   electrodialyzing said alkali metal salt of an amino acid surface active agent or acylated amino acid surface active agent and said mineral acid salt of an alkanolamine or ammonia, or said mixture of a mineral acid and an alkanolamine or ammonia,
   the amount of the alkanolamine or ammonia present being in the range of 1.0 to 3.0 times by mole that of the alkali metal salt, or the amount of the mineral acid present being in the range of 0.8 to 1.5 times that of the alkanolamine or ammonia,
   at a current density in the range of 0.1 to 10 amperes/dm²,
   thereby generating said alkanolammonium salt or ammonium salt of said amino acid surface active agent or said acylated amino acid surface active agent in purified form, while by-products can be removed outside.

2. The process for preparing an alkanol-ammonium salt or ammonium salt of an amino acid surface active agent or an acylated amino acid surface active agent as claimed in claim 1, wherein said amino acid surface active agent is selected from the compounds represented by the following formulae (a)-(f);

$$\underset{\underset{R_2}{|}}{R_1-N-(CH_2)_n COOH} \qquad (a)$$

in which $R_1$ represents a hydrogen atom, an alkyl group, alkenyl group, aralkyl group or hydroxyalkyl group each having 1 to 22 carbon atoms, or a group of the formula $$\underset{\underset{R_4}{|}}{R_3CON-CH_2CH_2-}$$

in which $R_3$ represents an alkyl group, alkenyl group or aralkyl group having 1 to 22 carbon atoms, or a hydroxyalkyl group, and $R_4$ represents a hydrogen atom, a methyl group, an ethyl group or a hydroxyethyl group, and $R_2$ represents a hydrogen atom, $-(CH_2CH_2O)_m-H$, $$\underset{\underset{CH_3}{|}}{-(CH_2CHO)_m-H,}$$

$-(CH_2)_n COOH$, in which m is an integer of from 1 to 10, and n is an integer of from 1 to 5, or an alkyl, alkenyl, aralkyl group or hydroxyalkyl group having 1 to 22 carbon atoms;

$$\underset{\underset{R_5\ CH_3}{|\ \ \ |}}{R_1-N-CHCOOH} \qquad (b)$$

in which $R_5$ has the same meaning as $R_2$ or $$\underset{\underset{CH_3}{|}}{-CHCOOH}$$

and $R_1$ has the same meaning as defined above;

$$\underset{\underset{R_2\ CH_2COOH}{|\ \ \ |}}{R_1-N-CHCOOH} \qquad (c)$$

in which $R_1$ and $R_2$ have the same meanings as defined above, respectively;

$$\underset{\underset{R_6\ \ \ CH_2COOH}{|\ \ \ \ \ \ \ \ |}}{R_1-N-CH_2CH-COOH} \qquad (d)$$

in which $R_6$ is a hydrogen atom, $-(CH_2CH_2O)_mH$,

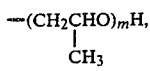

in which m has the same meaning as defined above,

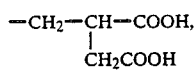

or an alkyl, alkenyl, hydroxyalkyl or aralkyl group having 1 to 22 carbon atoms;

$$R_1-N-(CH_2)_nSO_3H \qquad (e)$$
$$\qquad |$$
$$\qquad R_7$$

in which $R_7$ represents a hydrogen atom, $-(CH_2CH_2O)_mH$,

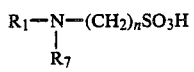

$-(CH_2)_nSO_3H$, in which m and n have, respectively, the same meanings as defined above, or an alkyl group, alkenyl group, hydroxyalkyl group or aralkyl group having 1 to 2 carbon atoms; and $$R_1-N-CH_2CHCH_2SO_3H \qquad (f)$$
$$\qquad | \qquad\quad |$$
$$\qquad R_8 \qquad\quad OH$$

in which $R_8$ represents a hydrogen atom, $-(CH_2CH_2O)_mH$,

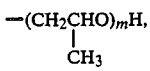

in which m has the same meaning as defined above,

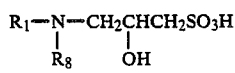

or an alkyl group, alkenyl group, hydroxyalkyl group or aralkyl group having 1 to 22 carbon atoms.

3. The process for preparing an alkanol-ammonium salt or ammonium salt of an amino acid surface active agent or an acylated amino acid surface active agent as claimed in claim 1, wherein said acylated amino acid surface active agent is selected from the compounds represented by the following formulae (g)–(i):

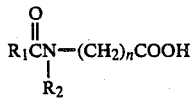

in which $R_1$ represents a hydrogen atom, an alkyl group, alkenyl group, aralkyl group or hydroyalkyl group each having 1 to 22 carbon atoms, or a group of the formula,

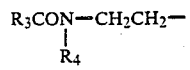

in which $R_3$ represents an alkyl group, alkenyl group or aralkyl group having 1 to 22 carbon atoms, or a hydroxylalkyl group, and $R_4$ represents a hydrogen atom, a methyl group, an ethyl group or a hydroxyethyl group, and $R_2$ represents a hydrogen atom, $-(CH_2CH_2O)_m-H$,

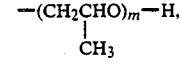

$-(CH_2)_nCOOH$, in which m is an integer of from 1 to 10, and n is an integer of from 1 to 5, or an alkyl, alkenyl, aralkyl group or hydroxyalkyl group having 1 to 22 carbon atoms;

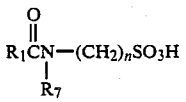

in which $R_1$ and n have, respectively, the same meanings as defined above, and
$R_7$ represents a hydrogen atom, $-(CH_2CH_2O)_mH$,

$-(CH_2)_nSO_3H$, in which m and n have, respectively, the same meanings as defined above, or an alkyl group, alkenyl group, hydroxylalkyl group or aralkyl group having 1 to 22 carbon atoms; and

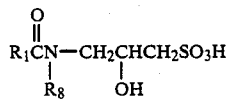

in which $R_1$ has the same meaning as defined above, and
$R_8$ represents a hydrogen atom, $-(CH_2CH_2O)_mH$,

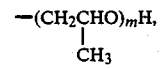

in which m has the same meaning as defined above,

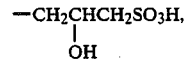

or an alkyl group, alkenyl group, hydroxyalkyl group or aralkyl group having 1 to 22 carbon atoms.

* * * * *